March 2, 1954  H. STAMM  2,670,591
BEARING FOR OSCILLATING WEIGHT IN MATCHES
WITH AUTOMATIC WINDING MECHANISM
Filed Oct. 13, 1950
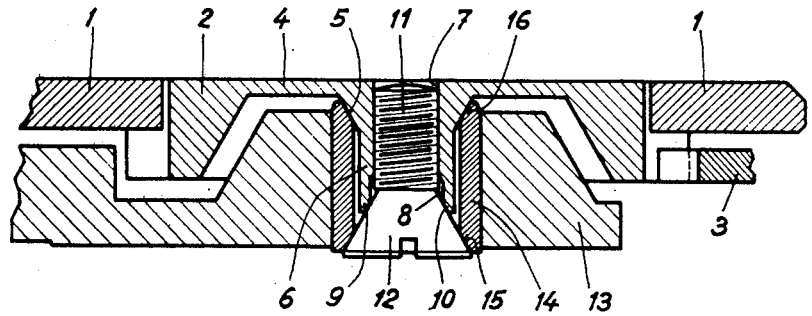
Inventor
Heinrich Stamm
By Young, Emery & Thompson
Attys.

Patented Mar. 2, 1954

2,670,591

UNITED STATES PATENT OFFICE 2,670,591

BEARING FOR OSCILLATING WEIGHT IN WATCHES WITH AUTOMATIC WINDING MECHANISM

Heinrich Stamm, Grenchen, Switzerland, assignor to ETA A. G., Ebauches-Fabrik, Grenchen, Switzerland, a joint-stock company Application October 13, 1950, Serial No. 189,958

Claims priority, application Switzerland October 21, 1949

4 Claims. (Cl. 58—82)

The present invention relates to a bearing for oscillating weight in watches with automatic winding mechanism, comprising a driving toothed wheel rigidly connected to said oscillating weight; according to the invention said driving wheel is recessed on one face.

The driving toothed wheel may have a pierced cylindrical hub with a conical foot, the end of the hub being countersunk conically.

Moreover the hole of the hub may be threaded to receive a screw with a conical head corresponding to the shaping of the hub end.

Finally it is possible to provide a hollow cylindrical bearing body, conically countersunk at its open ends, the two conical surfaces thus obtained forming the bearing surfaces of the stationary part, whereas the bearing surfaces of the movable part are formed on the one hand by the conical hub foot and on the other hand by the conical screw head.

The accompanying drawing shows, by way of example, an embodiment of the invention.

The single figure is a cross-sectional view thereof.

The support 1 of the oscillating weight, which is connected in a manner not shown to the oscillating weight, is rigidly fixed to the driving toothed wheel 2 whose rotation is transmitted to the watch barrel by a set of gear-wheels (not shown) the first mover of which is denoted by 3. The driving wheel 2 has on one face a recess the bottom 4 of which is connected to a conical hub foot 5 and to a cylindrical pierced hub 6. The hole 7 has, on the side of the end of the hub 6, a portion 8 of greater diameter which, contrary to the portion of smaller diameter, is not threaded. The end itself of the hub 6, that is, the edge 9 of the enlarged cylindrical portion 8, is internally countersunk in the form of a cone, this conical surface being designated by 10. A screw 11 is inserted into the hole 7, whose conical head 12 has an apex angle which corresponds to that of the conical surfaces 10 of the hub 6. The stationary part in which the driving wheel 2 is rotatively mounted with the support 1 of the oscillating weight and the screw 11, is formed by the plate 13 to which the cylindrical bearing body 14 is fixed rigidly. The two open ends of the bearing body 14 are internally countersunk in the form of a cone, thereby providing the conical surfaces 15 and 16 whose apex angles correspond to that of the conical screw head 12 and of the conical surface 10 of the hub end 9, respectively to that of the hub foot 5. The two conical surfaces 15 and 16 of the bearing body 14 form the bearing surfaces of the stationary part, the fixed bearing surface 16 cooperating with the hub foot 5 and the fixed bearing surface 15 cooperating with the conical screw head 12.

The assembly of the bearing described is simply effected in the following way: The screw 11 being removed, the driving wheel 2 is inserted with the support 1 so that its hub 6 enters the cylindrical bearing body 14 until the hub foot 5 abuts against the bearing surface 16 of the body 14. The screw 11 is then inserted and tightened. When the screw head 12 is locked in the conical surface 10, a certain clearance must remain between the screw head 12 and the bearing surface 15, and also between the hub foot 5 and the bearing surface 16. If after the mounting the clearance within the bearing body 14 should be too great, it is sufficient to countersink somewhat more the cylindrical edge of the hub. In the contrary case the bearing body 14 has to be countersunk somewhat more in a corresponding manner.

Due to the construction of the bearing of the invention for the same overall height, the distance between the two bearing surfaces is increased, i. e. the shaft portion between two bearing surfaces is lengthened, thereby contributing to stabilize the seating of the oscillating weight. Furthermore the bottom of the recess of the driving wheel can be made thin enough in order that it yields upon an axial shock. On that account the shock does not affect the bearing surfaces of the oscillating weight. This absorbing effect which, like the lengthening of the shaft portion between two bearing surfaces, is only possible because the provision of the recess in the driving wheel, contributes to remove the lack of stability and the danger of rupture which are so frequent in the bearings for oscillating weights.

What I claim is:

1. In an automatic winding mechanism for watches having an oscillating weight and a driving wheel fixed to said oscillating weight, the combination in which said driving wheel has a central recess on one side thereof, a hub projecting from said one side of the wheel within the recess axially thereof, said hub having a convex conical portion surrounding the same at its inner end, a rigid bearing body surrounding said hub and having at one end a concave conical end surface engaging the convex conical portion of the hub for supporting the driving wheel and the oscillating weight carried thereby in bearing engagement, said hub having an internally threaded axial bore, and a recess having a concave conical surface at the outer end thereof, and a screw having an enlarged head threadedly mounted in said threaded bore, the head of said screw having a convex conical portion with an apex angle equal to that of the concave conical surface of said recess at the end of said hub and positioned in said recess.

2. In an automatic winding mechanism for watches having an oscillating weight and a driving wheel fixed to said oscillating weight, the combination in which said driving wheel has a central recess on one side thereof, a hub projecting from said one side of the wheel within the recess axially thereof, said hub having a convex conical portion surrounding the same at its inner end, a rigid bearing body surrounding said hub and having at one end a concave conical end surface engaging the convex conical portion of the hub for supporting the driving wheel and the oscillating weight carried thereby in bearing engagement, said hub having an internally threaded axial bore, and a recess having a concave conical surface at the outer end thereof, and a screw having an enlarged head threadedly mounted in said threaded bore, the head of said screw having a convex conical portion with an apex angle equal to that of the concave conical surface of said recess at the end of said hub and positioned in said recess, said bearing body having a concave conical end surface at its other end having an apex angle equal to that of the conical portion of the screw head for receiving said portion of the screw head.

3. In an automatic winding mechanism for watches having an oscillating weight and a driving wheel fixed to said oscillating weight, the combination in which said driving wheel has a central recess on one side thereof, a hub projecting from said one side of the wheel within the recess axially thereof, said wheel having a flexible portion at the bottom of said recess for ensuring a resilient connection between said hub and the portion of the wheel surrounding the recess, and a rigid bearing body surrounding said hub and upon which the hub is supported in bearing contact.

4. In an automatic winding mechanism for watches having an oscillating weight and a driving wheel fixed to said oscillating weight, the combination in which said driving wheel has a central recess on one side thereof, a hub projecting from said one side of the wheel within the recess axially thereof, a convex conical portion provided on said hub, a rigid bearing body surrounding said hub, and a concave conical surface provided at one end of said bearing body for engaging said convex conical portion of the hub and supporting the driving wheel and the oscillating weight carried thereby in bearing engagement.

HEINRICH STAMM.

References Cited in the file of this patent

UNITED STATES PATENTS

| Number | Name | Date |
| --- | --- | --- |
| 2,039,875 | Benson | May 5, 1936 |
| 2,399,131 | Matter | Apr. 26, 1946 |
| 2,536,615 | Thiebaud | Jan. 2, 1951 |